(12) United States Patent
Bendapudi

(10) Patent No.: US 7,865,527 B2
(45) Date of Patent: Jan. 4, 2011

(54) DYNAMIC TABLES WITH DYNAMIC ROWS FOR USE WITH A USER INTERFACE PAGE

(75) Inventor: Jyotsna Bendapudi, Milpitas, CA (US)

(73) Assignee: Oracle International Corporation, Redwood Shores, CA (US)

( * ) Notice: Subject to any disclaimer, the term of this patent is extended or adjusted under 35 U.S.C. 154(b) by 178 days.

(21) Appl. No.: 11/278,015

(22) Filed: Mar. 30, 2006

(65) Prior Publication Data
US 2007/0239757 A1  Oct. 11, 2007

(51) Int. Cl.
*G06F 7/00* (2006.01)
*G06F 17/30* (2006.01)

(52) U.S. Cl. ........................ 707/793; 707/802
(58) Field of Classification Search ................ 715/509; 707/102, 793, 796, 802
See application file for complete search history.

(56) References Cited

U.S. PATENT DOCUMENTS

| | | | | |
|---|---|---|---|---|
| 5,794,229 | A * | 8/1998 | French et al. ................. | 707/2 |
| 6,564,212 | B2 * | 5/2003 | Koskas ........................ | 1/1 |
| 6,615,258 | B1 * | 9/2003 | Barry et al. ................. | 709/223 |
| 6,697,851 | B1 * | 2/2004 | Althaus et al. .............. | 709/220 |
| 6,718,515 | B1 * | 4/2004 | Conner et al. ............... | 715/509 |
| 6,834,279 | B1 * | 12/2004 | Chiang ...................... | 707/2 |
| 6,879,965 | B2 * | 4/2005 | Fung et al. .................. | 705/39 |
| 7,085,734 | B2 * | 8/2006 | Grant et al. ................. | 705/20 |
| 7,398,463 | B2 * | 7/2008 | Bernstein et al. ............ | 715/235 |
| 2006/0112399 | A1 * | 5/2006 | Lessly ........................ | 719/318 |

OTHER PUBLICATIONS

Oracle Business (Oracle Corporation, "XML Publisher/Oracle Applications Framework Technology Update Nov. 5, 2010," 2004, pp. 1-50).*
Publishing Concurrent Request (Oracle, "Publishing Concurrent Requests," Jan. 2005, pp. 1-17).*
XML Publisher (Oracle, "Oracle XML Publisher User's Guide," Aug. 2004, pp. 1-70).*

* cited by examiner

*Primary Examiner*—John R. Cottingham
*Assistant Examiner*—Hexing Liu
(74) *Attorney, Agent, or Firm*—Aka Chan LLP

(57) ABSTRACT

Methods and apparatus for rendering tables for display in a web page of a web application to be dynamically rendered. According to one aspect of the present invention, a method for rendering tables associated with a web application arranged to display a first page includes obtaining an input to the web application, determining an input type associated with the input, and identifying a set of tables associated with the input type. The method also includes identifying an entity associated with the input, obtaining data associated with the entity, identifying a table of the set of tables, and determining if the data is suitable for populating the table. If the data is determined to be suitable, the table is displayed as a part of the first page.

27 Claims, 9 Drawing Sheets

DYNAMIC TABLES WITH DYNAMIC ROWS FOR USE WITH A USER INTERFACE PAGE

BACKGROUND OF THE INVENTION

1. Field of Invention

The present invention relates generally to developing web applications such as applications for the World Wide Web. More particularly, the present invention relates to a system which allows a number of tables and a number of rows of data which may have dynamic properties in each table to be determined dynamically and displayed.

2. Description of the Related Art

Software developers often develop web applications, e.g., applications associated with the World Wide Web, that provide user interfaces that allow users to efficiently access information and data. Tables are often used as user interface components to represent data derived from contents of a view instance in a tabular form. The presentation of data in tabular form allows a user to readily organize the data, as for example by sorting columns in a table.

Typically, a fixed, or static, set of tables is presented in user interface windows. When a user enters input into a user interface window, the input is used to identify at least one table that is to be displayed. In a web application, input data generally has a particular set of tables associated therewith. While the input types designate the set of tables and which tables to display, as well as the names of the tables and the columns of the tables, the inputs themselves identify the number of rows that are included in the tables.

With reference to FIG. 1A, a standard table that may be displayed in a window that displays a user interface page associated with a web application will be described. A user interface page 102 includes an area 108 into which a user input may be entered. Depending upon the type of input entered into area 108, at least one appropriate table 106 will be displayed. Table 106 is typically specified as including a particular number of columns 110, 114, while a number of rows 118a-g may vary depending upon the amount of information that is to be displayed in table 106. That is, the number of rows 118a-g is dynamic. The particular number of columns 110, 114 is specific to table 106, i.e., is substantially static with respect to table 106.

The number of tables included in a user interface page associated with a web application may vary depending upon requirements of a particular input. By way of example, for a web application associated with a bank transaction, the input may be a customer login. The web application may, when any customer login is detected, display a fixed or otherwise static number of tables. The tables may each have any number of rows that are specific to the particular customer login that is inputted.

FIG. 1B is a diagrammatic representation of a user interface page of a web application which displays a plurality of tables. A user interface page 122 includes an input area 128 that is arranged to accept an input, as for example a customer login. Tables 136a, 136b are displayed after the input is entered. As shown, an input entered into input area 128 causes tables 136a, 136b which each include two columns to be displayed. Table 136a includes columns 130, 134, while table 136b includes columns 140, 144.

The input into input area 128 is such that table 136a includes five rows 138a-e, while table 136b includes two rows 148a, 148b. Hence, the input has data or information associated with both tables 136a, 136b, as indicated by each table 136a, 136b including at least one row. By way of example, if the input into input area 128 is a customer login for a bank transaction, table 136a may be arranged to display savings account numbers associated with the customer login in column 130 and corresponding balances in column 134. Similarly, table 136b may be arranged to display checking account numbers associated with the customer login in column 140 and corresponding balances in column 144.

Typically, the type of input into input area 128 determines the number of tables 136a, 136b that are displayed, whereas the actual input into input area 128 determines the number of rows 138a-e in table 136a, and the number of rows 148a, 148b in table 136b. That is, an input type specifies the number and names of tables displayed, while information associated with the input specifies the number of rows in each table. Returning to the bank transaction example, even if a customer identified by a customer login does not have at least one associated checking account, a table that is associated with checking accounts is displayed, though the table would have no rows included for data. A table for savings accounts and a table for checking accounts are generally shown for each customer login input as a web application is created to specify that an input type that is a customer login causes both tables to be displayed.

FIG. 1C is a diagrammatic representation of a user interface page of the same web application as associated with user interface page 122 of FIG. 1B, as shown with a substantially empty table. A user interface page 162 is arranged to accept an input into an input area 168. Once the input is accepted, tables 176a, 176b are displayed. If the input is a customer login for a bank transaction, for example, table 176a may display a column 170 for savings account numbers and a column 174 for associated balances, while table 176b may display a column 180 for checking account numbers and a column 184 for associated balances. As the customer login is associated with a plurality of savings accounts, rows 138a-e are displayed as a part of table 176a. As shown, the customer login is not associated with any checking accounts. However, a substantially empty table 176b that is arranged to contain information relating to checking accounts associated with the customer login is shown.

The steps associated with displaying tables in a user interface page of a web application will be described with reference to FIG. 2. A process 200 of displaying tables in a user interface page of a web application begins at step 204 in which input is provided through a user interface of a window or page, e.g., a web page. The input, which may be input into an input area of a user interface page such as input area 108 of FIG. 1A, is parsed or otherwise examined by the web application upon entry. A fixed set of tables, or a fixed number of tables, is generated in step 206 based upon the type of input that was provided. Some types of input may be associated with a single table, while other types of input may be associated with more than a single table. It should be appreciated that while the number of tables that are displayed is fixed for each type of input, the number of rows in each table is dependent, at least in part, upon information provided in the input.

After generating a fixed set of tables, the tables are populated appropriately in step 208. By way of example, for each table that is generated, when the input has associated data to display in the table, the table is effectively populated with that data. If the input does not have data that pertains to a particular table, though the table is generated, the table is not populated with any data associated with the input. Then, in step 210, the fixed set of tables is displayed for the type of input that has been provided. Each table is displayed with rows which contain data associated with the input that corresponds to the intended content of the table. Hence, a table may be displayed with no rows of data in the event that the input has no data that corresponds to the intended content of the table. Once the fixed set of tables is displayed, the process of displaying tables in a user interface page is completed.

Displaying a fixed set of tables for an input type to a web application is effective in enabling information associated with the input to be provided for viewing. In some instances, however, when a particular input of an input type has no associated information for a given table, displaying the table with no rows of data may be inefficient. Tables with substantially no content effectively occupy display space, and essentially do not provide any useful information. Occupying display space with tables that have substantially zero content may clutter up a display window, and confuse a viewer.

Therefore, what is needed is a method and an apparatus that prevents substantially empty tables from being displayed. That is, what is desired is a system that enables inputs of the same input type to potentially display different sets of tables.

SUMMARY OF THE INVENTION

The present invention relates to allowing tables that are rendered for display in a web page of a web application to be dynamically rendered. According to one aspect of the present invention, a method for rendering tables associated with a web application arranged to display a first page includes obtaining an input to the web application, determining an input type associated with the input, and identifying a first set of tables associated with the input type. The method also includes identifying an entity associated with the input, obtaining data associated with the entity, identifying a first table of the first set of tables, and determining if the data is suitable for populating the first table. If the data is determined to be suitable, the first table is displayed as a part of the first page.

In one embodiment, the method also includes preventing the first table from being displayed on the first page if the data is not suitable for populating the first table. In another embodiment, the first table includes a number of rows, and the method further includes determining the number of rows using the data.

Allowing the tables that are to be displayed on a user interface web page to be dynamically rendered enables allowing relevant tables to be displayed while substantially irrelevant tables are not displayed. As input types generally have a standard or fixed set of associated tables, dynamic rendering provides the capability for displaying substantially only those tables of the standard set of tables which are relevant to a particular input, e.g., for which a particular input has associated data, to be displayed. Hence, tables that would effectively contain no data associated with the particular input are not displayed.

According to another aspect of the present invention, a method for dynamically rendering tables associated with a first input type to a web application includes obtaining an input of the first input type that is utilized to identify data, and associating the data with at least a first table of a set of tables associated with the first input type. The first table is populated by the data, and provided in a web page of the web application.

In one embodiment, at least a second table of the set of tables is not arranged to be populated by the data. In such an embodiment, the method also includes preventing the second table from being provided to the web page.

These and other features and advantages of the invention will become readily available apparent upon review of the following description in association with the accompanying drawings, where the same or similar structures are designated with the same reference numerals.

BRIEF DESCRIPTION OF THE DRAWINGS

The invention may best be understood by reference to the following description taken in conjunction with the accompanying drawings in which.

DETAILED DESCRIPTION

In the description that follows, the present invention will be described in reference to embodiments that test subsystems on a platform for a software application, such as a database application. However, embodiments of the invention are not limited to any particular architecture, environment, application, or implementation. For example, although embodiments will be described in reference to network database applications, the invention may be advantageously applied to any software application. Therefore, the description of the embodiments that follows is for purposes of illustration and not limitation.

Typically, each input type accepted by a user interface page of an application has an associated set of tables. Each table in the set of tables is generally displayed each time an input of the input type is entered into the application. When tables which do not include content associated with a user input are displayed to a user, the user may be confronted with essentially irrelevant information. Providing effectively empty tables in a user interface web page may unnecessarily clutter the display of the web page.

Allowing tables displayed in a user interface page of an application to be dynamically rendered allows the display of the tables to be customized to a particular user input. That is, for each input type accepted by the user interface type, the tables that are displayed are customized to the particular input. Hence, although the input type has an essentially fixed, associated set of tables, substantially only those tables of the set which would be populated by data are displayed. Displaying substantially only those tables which contain data associated with an input, even though the input type has more tables associated therewith, a user interface page is effectively customized to the input. In some instances, the data contained in dynamic tables with dynamic rows may include dynamic content.

Figure 1A:
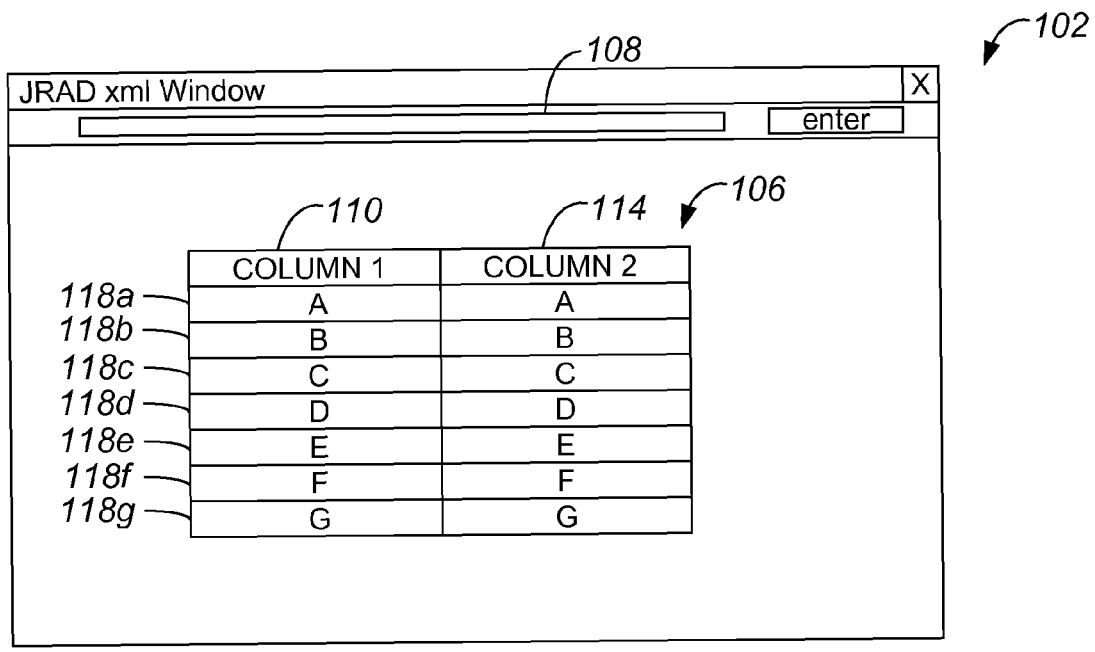
FIG. 1A is a diagrammatic representation of a user interface window of a web application that includes a table.
Figure 1B:
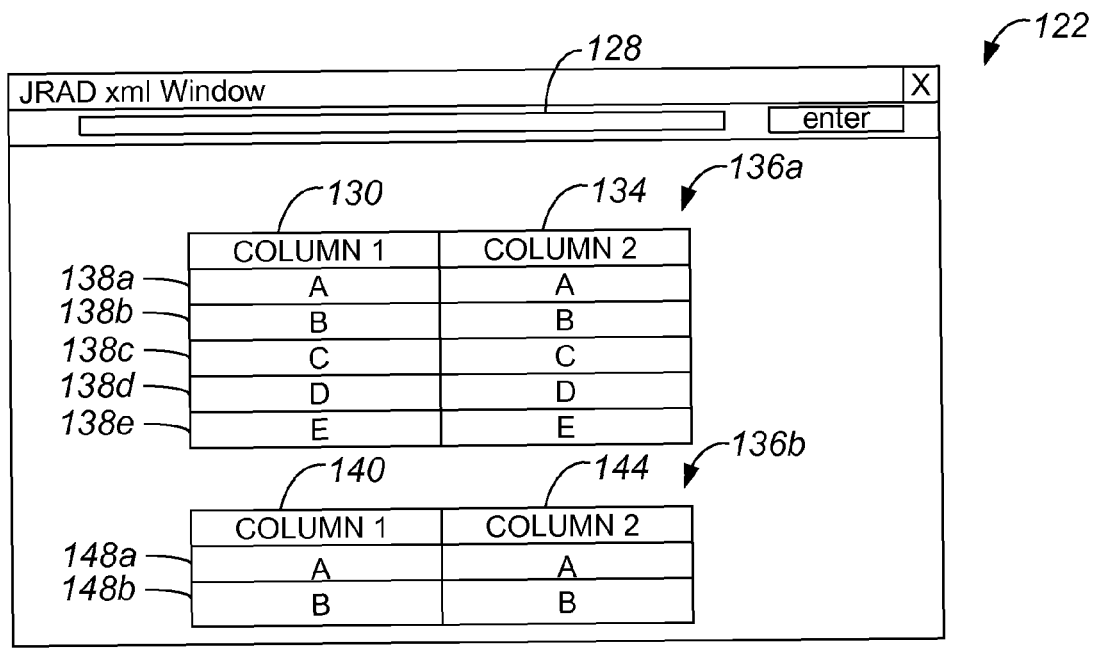
FIG. 1B is a diagrammatic representation of a user interface window of a web application that includes a plurality of tables.
Figure 1C:
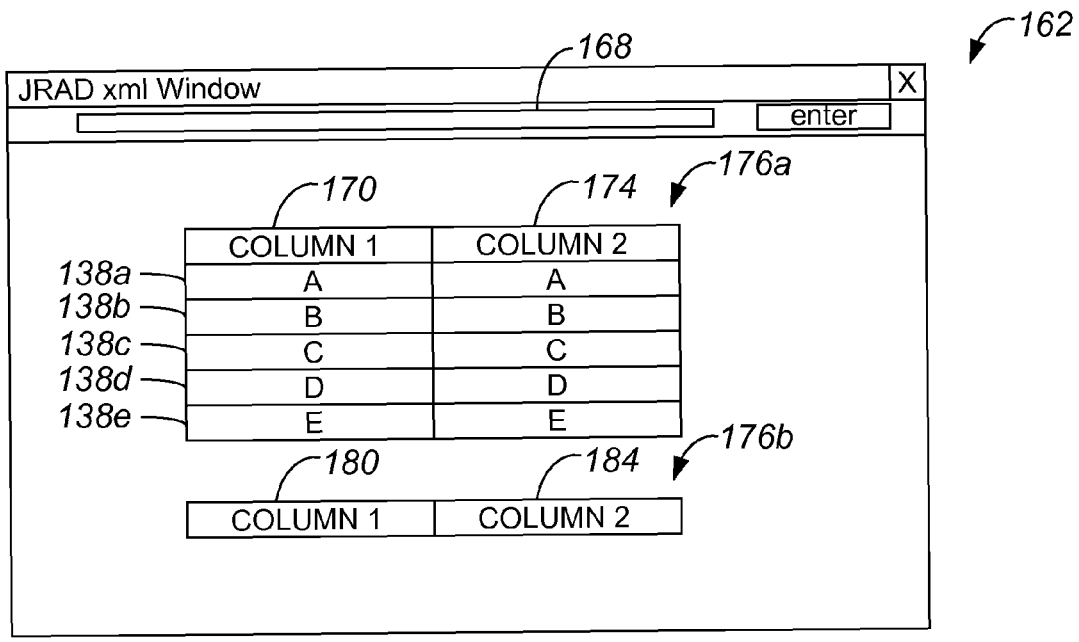
FIG. 1C is a diagrammatic representation of a user interface window of web application that includes a substantially empty table.
Figure 2:
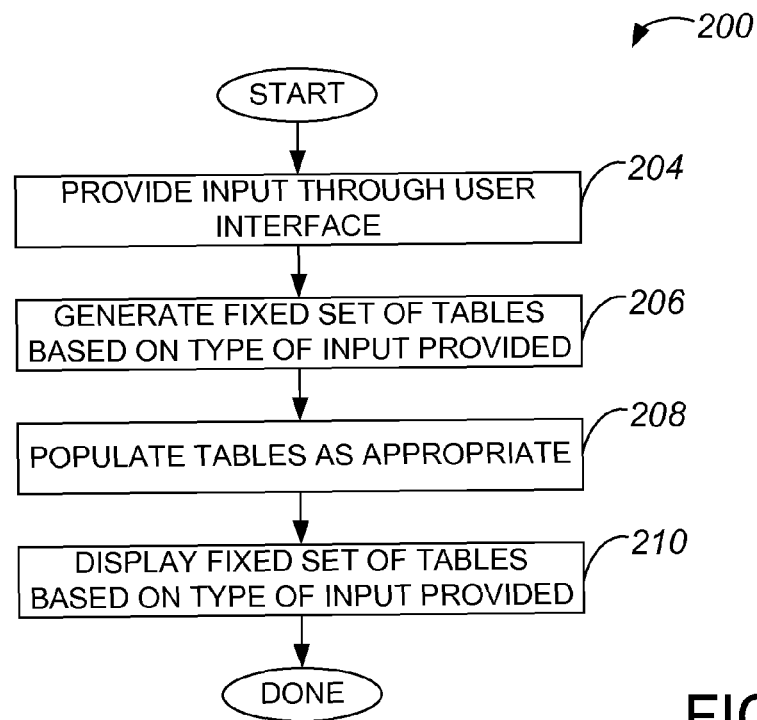
FIG. 2 is a process flow diagram which illustrates steps associated with one method of displaying a fixed set of tables.
Figure 3:
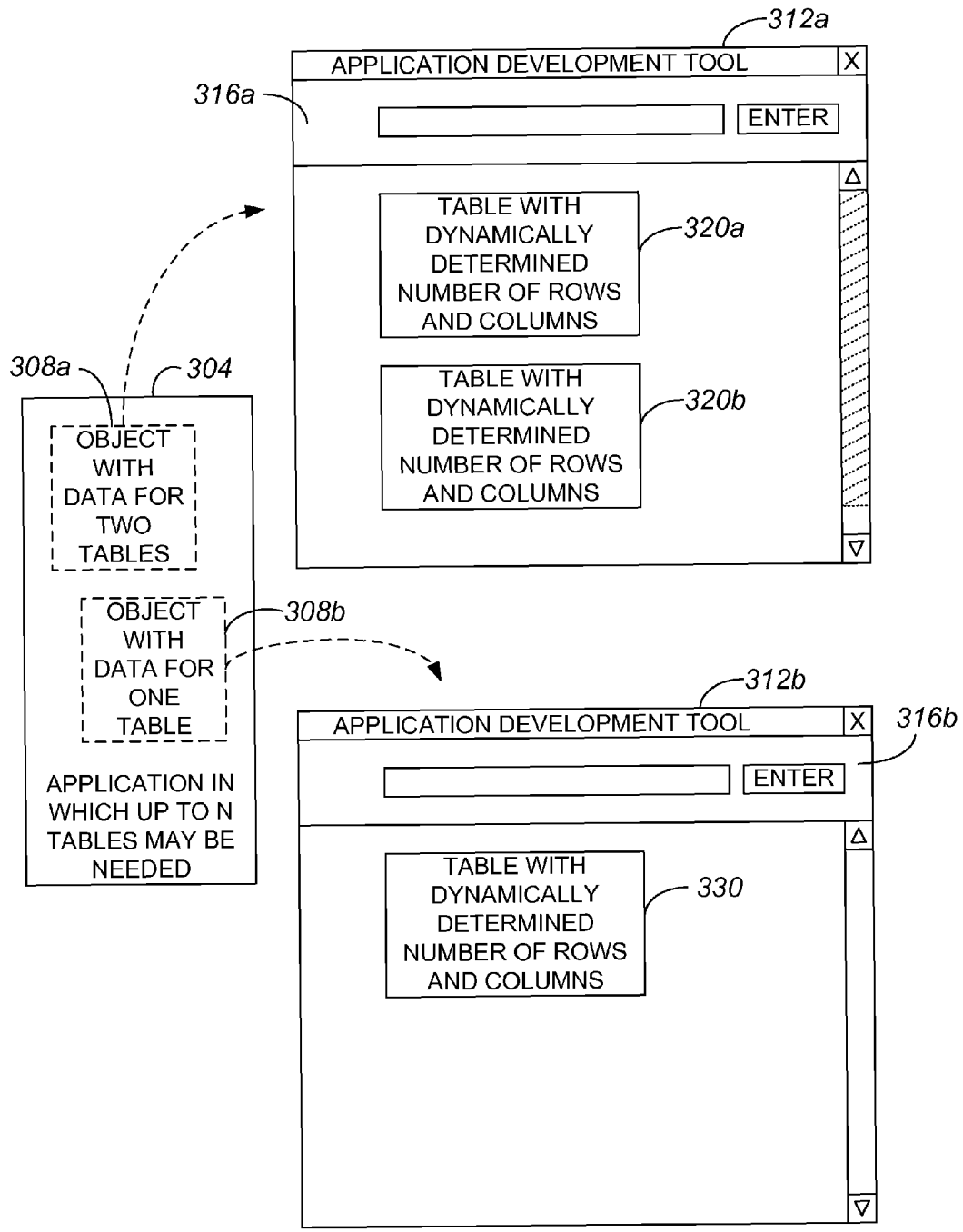
FIG. 3 is a diagrammatic representation of displays associated with different objects associated with a single application in accordance with an embodiment of the present invention.

A particular input type may have instances in the form of objects. Hence, when a first input of the input type has data that is suitable for display in two tables while a second input of the input type has data that is substantially only suitable for display in a single table, the objects associated with the first and second objects may reflect this difference. Referring to FIG. 3, displaying tables associated with different objects associated with a single application in accordance with an embodiment of the present invention. A web application 304 is an application in which up to N tables may be needed to display information pertaining to an input type. Web application 304 is generally an application delivered to users from a web server over a network such as the World Wide Web or an intranet. In general, client data that is input into web application 304 typically causes business logic on the web server to execute.

A first object 308a, which is associated with the input type, effectively has data that may be displayed in two tables. A second object 308b, which is also associated with the input type, effectively has data that may be displayed in one table. In lieu of displaying N tables for each object 308a, 308b in which either two tables or one table, respectively, are populated, only tables which may be populated with data are displayed, as for example as a part of a user interface page. A first user interface page 312a associated with first object 308a includes an input area 316a into which an input of the input type that corresponds to first object 308a may be inputted. In response to the input, a first table 320a and a second table 320b that are associated with the first input are rendered and displayed. Each table 320a, 320b has a number of rows that may be dynamically determined. In one embodiment, each table 320a, 320b may also have rows that are dynamically determined.

Similarly, a second user interface page 312b is arranged, in response to an input associated with second object 308b that is provided in input area 316b, causes substantially only table 330 to be displayed. As second object 308b has data that is substantially only relevant to one table, only table 330, which may include a dynamically determined number of rows and columns, is displayed. By not displaying all N tables associated with the input type to application 304, a user is presented substantially only with tables that are relevant to a particular input of the input type.

Figure 4A:
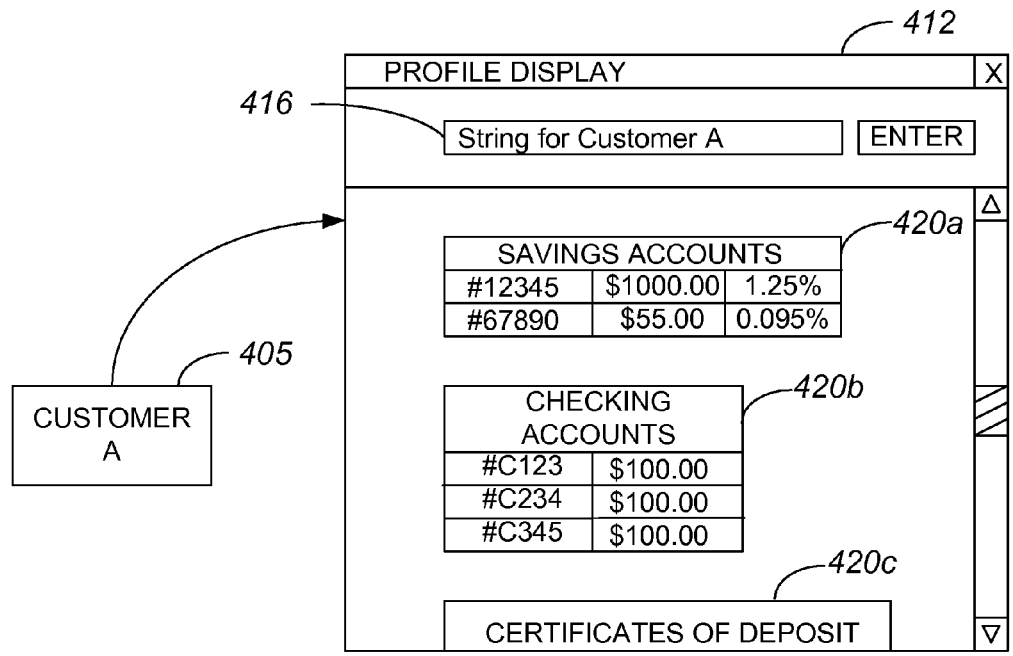
FIG. 4A is a diagrammatic representation of a display associated with a first customer of a bank transaction web application that uses dynamic tables in accordance with an embodiment of the present invention.
Figure 4B:
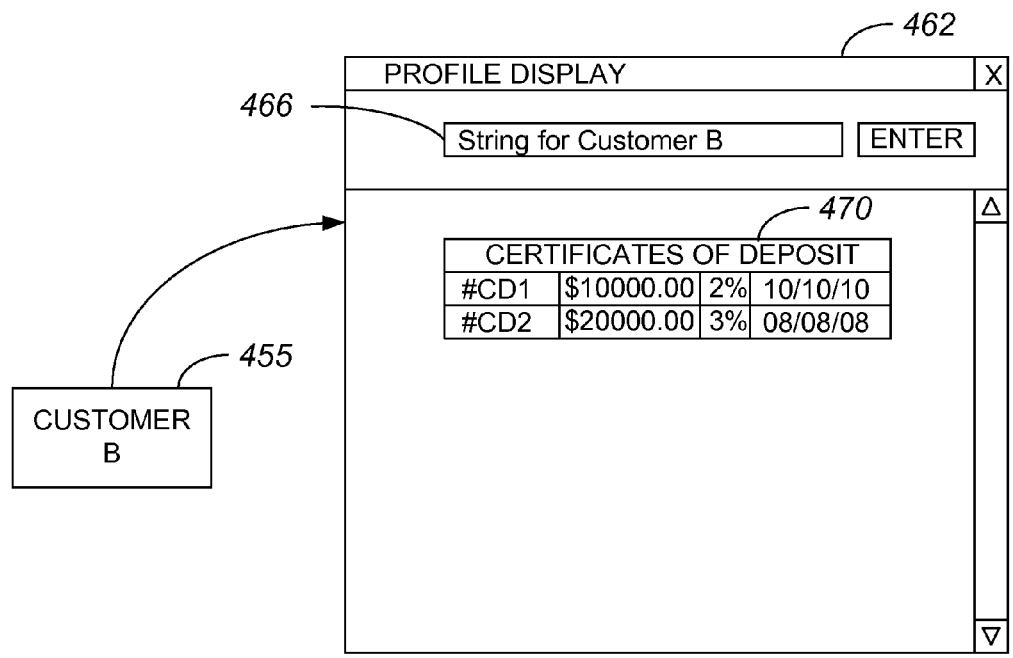
FIG. 4B is a diagrammatic representation of a display associated with a second customer of a bank transaction web application that uses dynamic tables in accordance with an embodiment of the present invention.

With reference to FIGS. 4A and 4B, an example of a web application in which tables may be dynamically rendered will be described. FIG. 4A is a diagrammatic representation of a display associated with a first customer of a bank transaction web application that uses dynamic tables in accordance with an embodiment of the present invention. A user interface page 412 that displays profiles associated with banking customers is arranged to accept an input string into an input area 416 that provides at least one value associated with a customer A 405. The web application, in the described embodiment, is arranged to display information pertaining to accounts owned by customer A 405 when the input string is of a first input type.

The first input type may be associated with any number of tables. In the embodiment as shown, at least three types of tables are associated with the first input type, namely a table that displays savings accounts owned by a customer, checking accounts owned by a customer, and certificates of deposit owned by a customer.

Tables rendered for customer A 405 include a savings account table 420a, a checking account table 420b, and a certificates of deposit table 420c. The number of rows and columns in such tables 420a-c may vary widely, e.g., depending upon the number of accounts owned by customer A 405. Substantially only tables 420a-c which are relevant to customer A 405 are shown. As shown, customer A 405 has savings accounts, checking accounts, and at least one certificate of deposit.

FIG. 4B is a diagrammatic representation of a display associated with a second customer of a bank transaction web application that uses dynamic tables in accordance with an embodiment of the present invention. A user interface page 462 is associated with the same application that user interface page 412 of FIG. 4A is associated with. An input string of the first input type, i.e., the same input type as the input string inputted into input area 416 of FIG. 4A, is input into an input area 466. The input string provides at least one value associated with a customer B 455.

As discussed above with respect to FIG. 4A, the first input type is associated with at least three tables. In the described embodiment, customer B 455 substantially only owns certificates of deposit. Hence, although there are a plurality of tables associated with the first input type, as customer B 455 substantially only has data associated with a table that displays certificates of deposit, user interface page 462 shows substantially only table 470. The number of rows and, in some cases, columns in table 470 is dependent at least in part on the number of certificates of deposit owned by customer B 455. Although the first input type has more than one associated table, substantially only one table is displayed in user interface page 462 because customer B 455 does not have accounts to display in the other tables, i.e., tables which would not be populated with data are not displayed.

Figure 5:
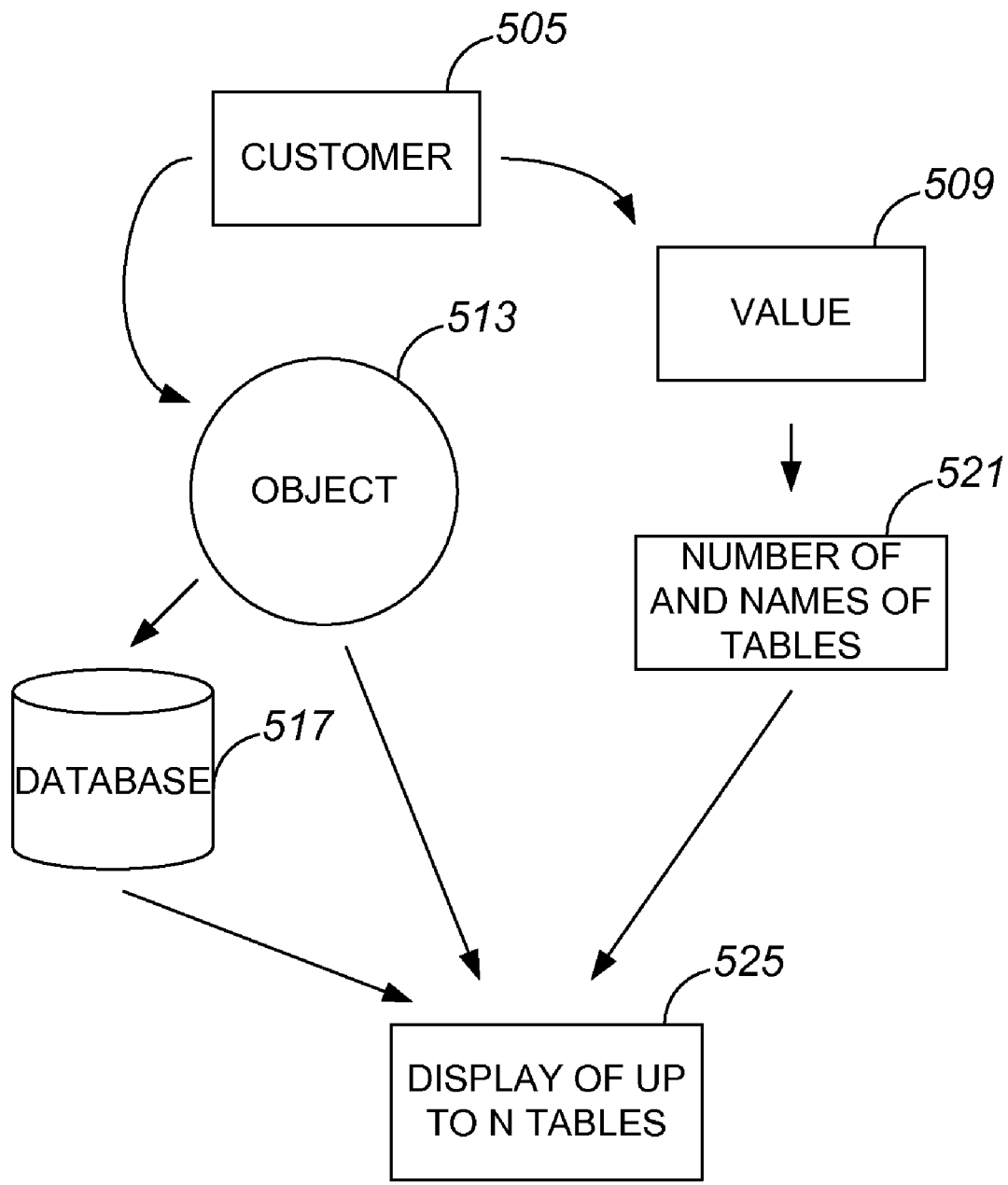
FIG. 5 is a block diagram representation of components from which information is updated to create a display of a dynamic set of tables in accordance with an embodiment of the present invention.

In general, information used to dynamically render tables for display in a user interface page is provided by a customer, and by a database or a repository. Referring next to FIG. 5, components of an overall system that are used to dynamically render tables will be described in accordance with an embodiment of the present invention. A customer 505 provides an input to an application that includes a value 509. Value 509 may indicate an input type which is associated with a particular set of N tables 521. An object 513 associated with customer 505 effectively identifies information that is associated with the input provided to the application. A database 517, which is accessed by object 513, contains information associated with customer 505 that may be used to populate appropriate tables. Using object 513, database 517, and tables 521 that are associated with the input type indicated by value 509, a display 525 of up to N tables may be created. Only tables which would contain data associated with or relevant to customer 505 would be part of display 525.

Figure 6:
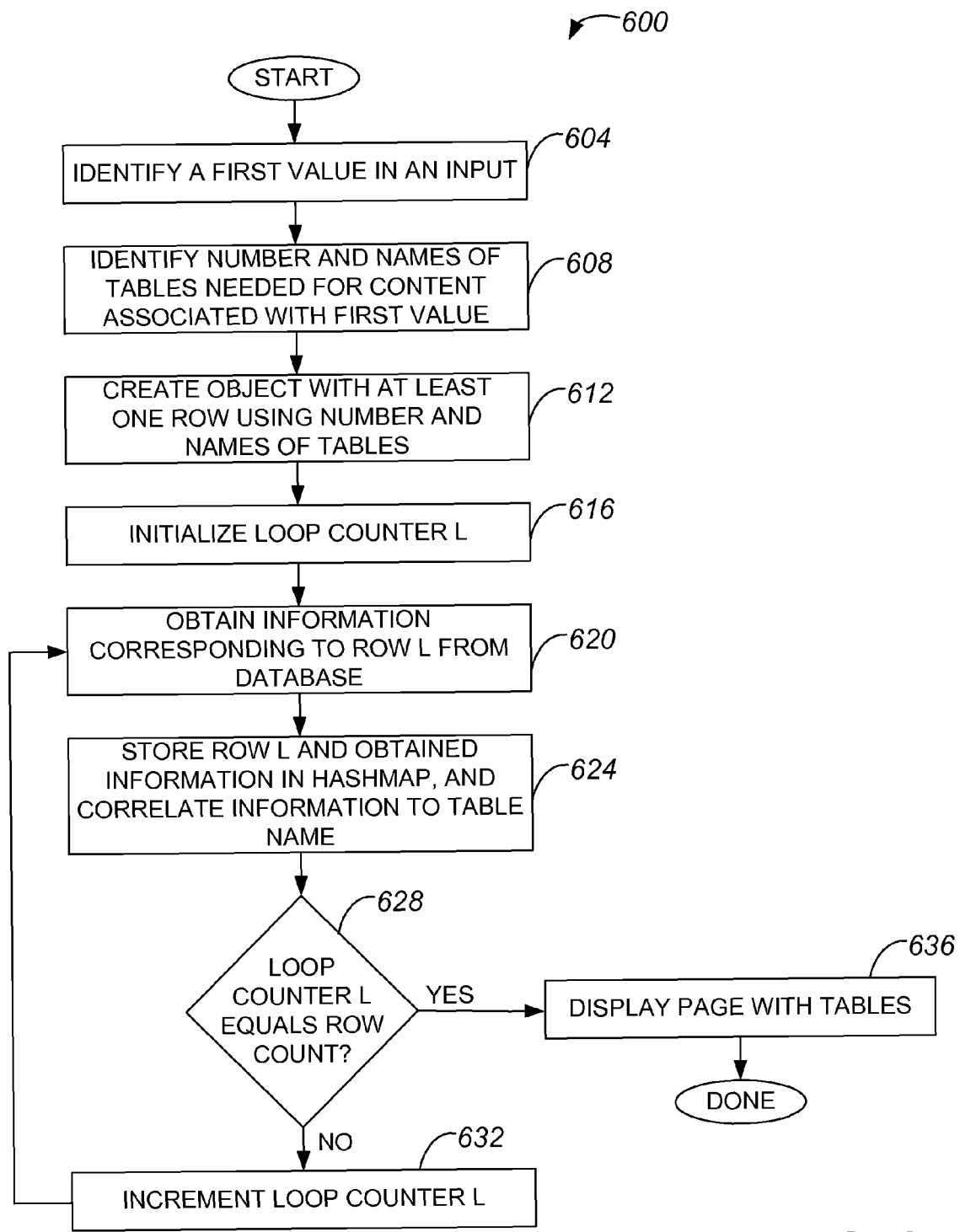
FIG. 6 is a process flow diagram which illustrates a method of determining which tables to display for an instance of an input type in accordance with an embodiment of the present invention.

FIG. 6 is a process flow diagram which illustrates a method of determining which tables to display for an instance of an input type in accordance with an embodiment of the present invention. A process 600 of identifying tables to be displayed on a web page begins at step 604 in which an input is received through a user interface of the web page, and a first value associated with the input is identified. The first value may be arranged to be used to effectively fetch information that is to be displayed, and to determine a number of tables to be displayed. The input may be received in a variety of different ways including, but not limited to, receiving the input as a command line string, receiving the input as a selection from a pop list, or receiving the input as a selection from a pulldown menu. In one embodiment, a parameter provided with a command line string may include the first value.

Once the first value in the input is identified, a number of tables, as well as the names of the tables, that is needed to display content associated with the first value is identified in step 608. An object is created in step 612 with at least one row using the number of tables and the names of the tables. The object, which may be a Java object or a Java object vector, may include multiple rows of name and value pairs associated, in some instances, with dynamic content and URLs to be displayed. In one embodiment, each row of the object may correspond to a table that is to be used to display content associated with the first value.

After the object is created, a loop counter L is initialized in step 616. Then, in step 620, information corresponding to row L of the object is obtained, as for example from a database or a repository. Information stored in rows of an object may include pointers or indexes into a database in which additional information, or data, is stored. The information or data stored in the database is typically used to populate tables. Upon obtaining information corresponding to row L in the object, information relating to row L, as well as the obtained information, is stored in a hashmap or similar data structure, and the information is correlated to a particular table in step 624. By way of example, if the obtained information is a checking account number, the information may be correlated to a table that is arranged to display checking account information. It should be appreciated that in one embodiment, there may be no information to obtain with respect to row L. In such an embodiment, information relating to row L may not necessarily be stored in the hashmap, i.e., the hashmap in one embodiment may contain substantially only information relating to tables which will be displayed, or information may be stored that indicates that substantially no information corresponding to row L has been obtained from a database. That is, when row L does not have associated information, row L is not stored in the hashmap, as the hashmap is arranged to store information that will be displayed in a table.

As will be appreciated by those skilled in the art, a hashmap, which is associated with a Java class, provides the ability to look up values using a key, and is similar to a hashtable. A hashmap, in the described embodiment, may include a vector of data associated with rows. In lieu of using hashmaps, hashtables or other suitable data structures may instead be used, as for example if the Java language is not used to code an application which dynamically renders tables. Hashmaps function with iterators, whereas hashtables function with enumerations. An instance of a hashmap may have approximately two parameters that affect performance, e.g., an initial capacity and a load factor. A capacity may be associated with a number of buckets in a hashmap. Hence, and initial capacity may be the capacity of the hashmap at the time of creation. A load factor may be an indication of how full the hashmap may be before the capacity is automatically increased.

A determination is made in step 628 as to whether loop counter L equals the row count. That is, it is determined whether substantially all rows in the object have been accounted for in the hashmap. If the determination is that loop counter L equals the row count, a user interface page with tables is displayed in step 636. One method of displaying tables in a user interface page will be described below with reference to FIG. 7. It should be appreciated that in the event that a hashmap is empty, or if the number of hashmaps equals zero, rather than displaying tables, a message that indicates that there are no tables or data to be displayed may be displayed instead.

Alternatively, if the determination in step 628 is that loop counter L does not equal the row count, the implication is that there are additional rows in the object to process. In other words, there is an additional table to process. Accordingly, in step 632, loop counter L is incremented. Once loop counter L is incremented, process flow returns to step 620 in which information corresponding to row L is obtained, e.g., from a database or a repository.

Figure 7:
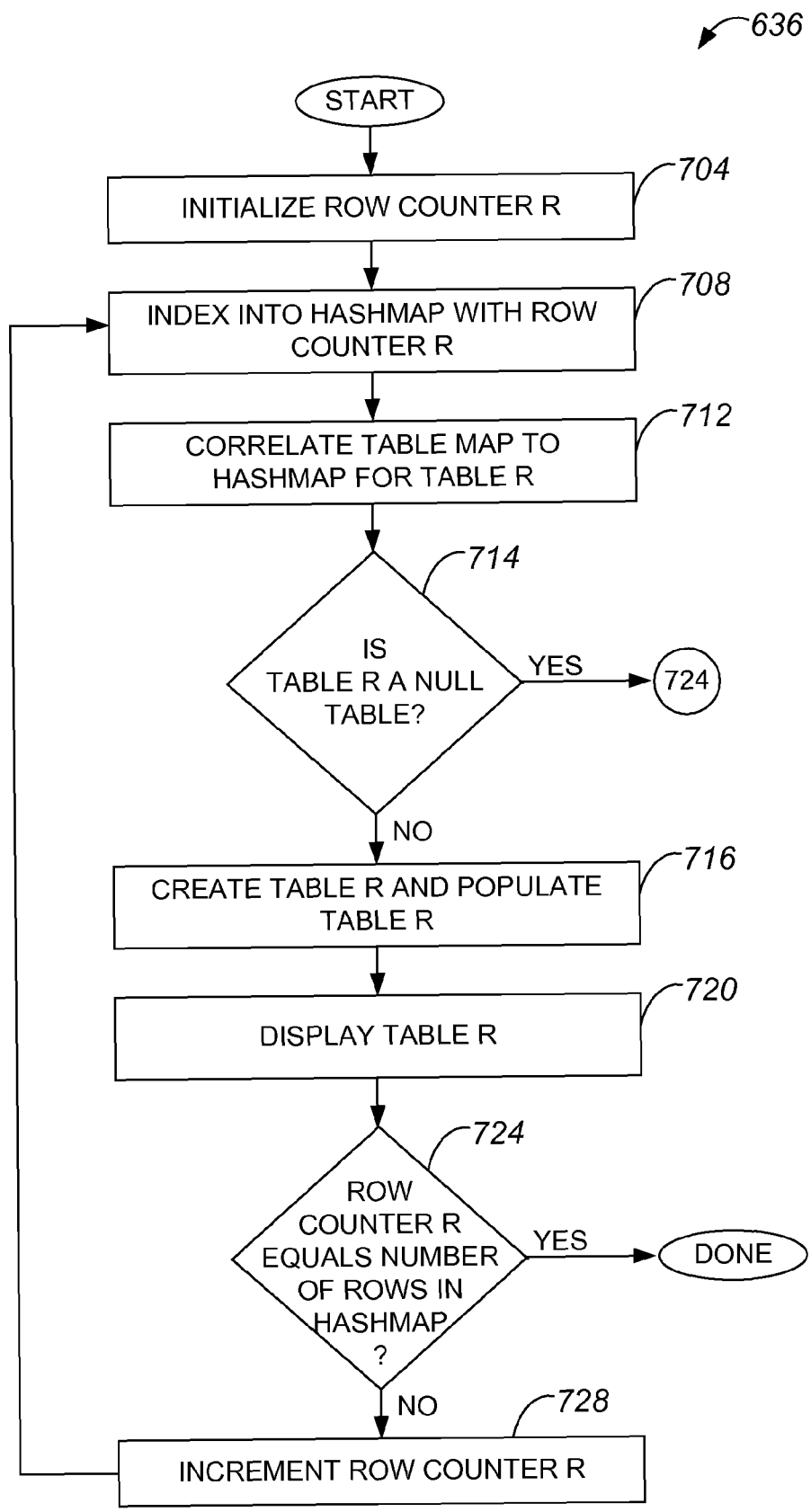
FIG. 7 is a process flow diagram which illustrates one method of displaying a user interface page with at least one table, e.g., step 636 of FIG. 6, in accordance with an embodiment of the present invention.

Referring next to FIG. 7, one method of displaying a user interface page with tables, e.g., step 636 of FIG. 6, will be described in accordance with an embodiment of the present invention. A process 636 of displaying a user interface page begins at step 704 in which a row counter R is initialized. After row counter R is initialized, row counter R is used in step 708 to index into a hashmap in which information corresponding to any tables that are to be displayed is stored. A table map is correlated to the hashmap in step 712.

A determination is made in step 714 whether table R is a null table. That is, it is determined whether there are any contents to store in table R. If it is determined that table R is a null table, process flow proceeds to step 724 in which it is determined whether row counter R equals the number of rows in the hashmap. If it is determined that row counter R equals the number of rows in the hashmap, the process of displaying a user interface page is completed. Alternatively, if the determination is that row counter R does not equal the number of rows in the hashmap, row counter R is incremented in step 728, and process flow returns to step 708 in which row counter R is used to index into the hashmap.

Returning to step 724, if it is determined that table R is not a null table, the indication is that table R contains information that may be displayed in the user interface page. As such, in step 716, table R is created and populated. It should be appreciated that populating table R may include effectively looping through information stored in the hashmap for table R and creating individual rows for the information as appropriate. After the table R is created and populated, table R is displayed in step 720. Then, process flow proceeds to step 724 in which it is determined if row counter R equals the number of rows in the hashmap.

Figure 8:
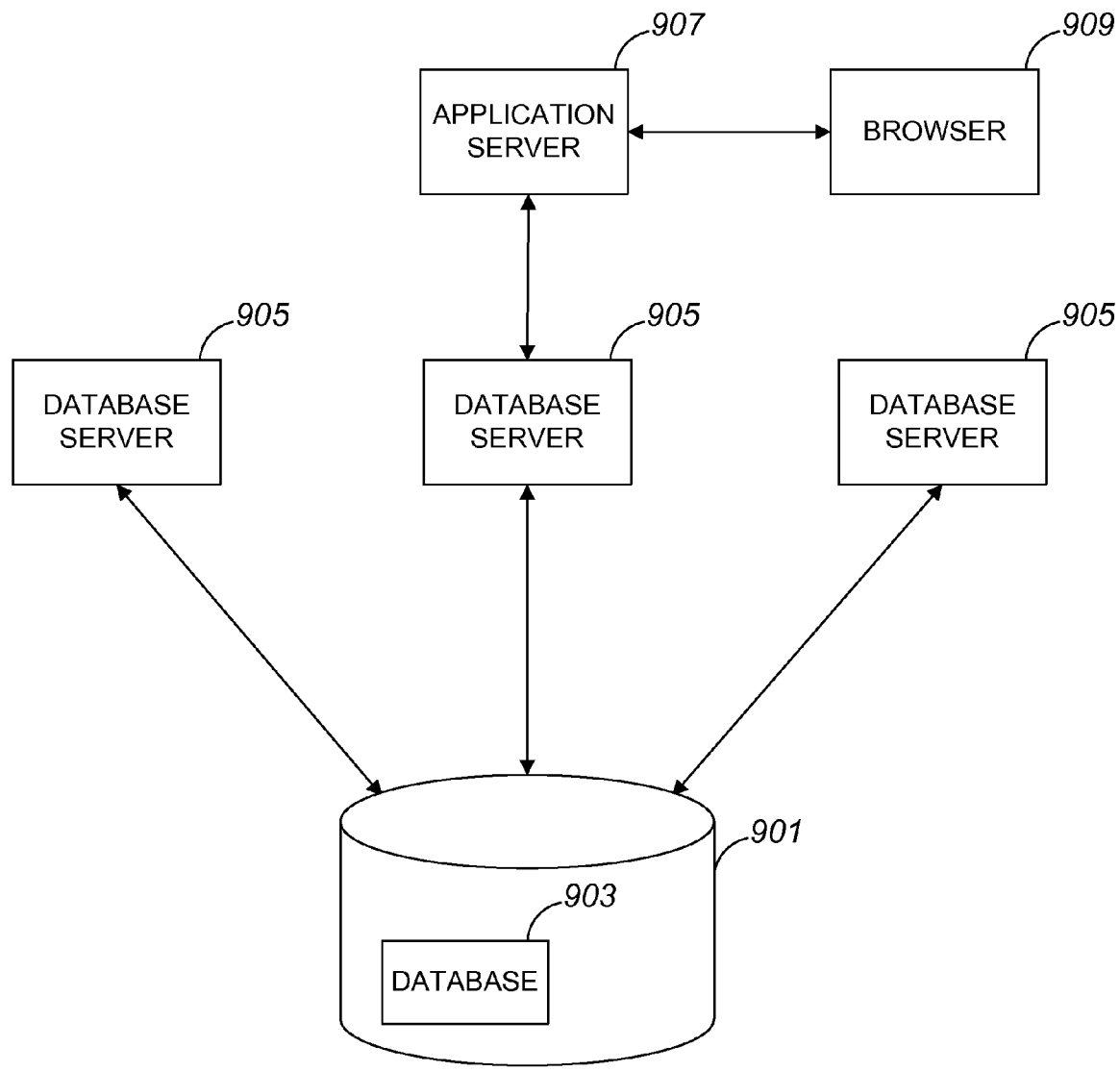
FIG. 8 is a block diagram representation of a database management system architecture.

A web application with a user interface page that allows for dynamic table rendering may be utilized as a part of, or in conjunction with, a database management system. One suitable database management system architecture is the three-tiered architecture that is shown in FIG. 8. At the core of a database management system is a central storage 901 that stores a database 903 or a repository. Database 903 is typically stored on one or more hard drives, and is typically part of a larger computer system. The information may be stored on database 903 in a variety of formats with relational database management systems relying heavily on tables to store the information. Database servers 905 are instances of a program that interacts with database 903. Each instance of a database server 905 may, among other features, independently query database 903 and store information therein.

In some instances, database servers 905 may not include user friendly interfaces, such as graphical user interfaces.

Accordingly, at least one application server 907 may provide the user interfaces to database servers 905. By way of example, application server 907 may be a web application server on the Internet, or any other network. Application server 907 may provide user friendly mechanisms for accessing database 903 through database servers 905. A web browser 909 may be utilized to access application server 907.

Figure 9:
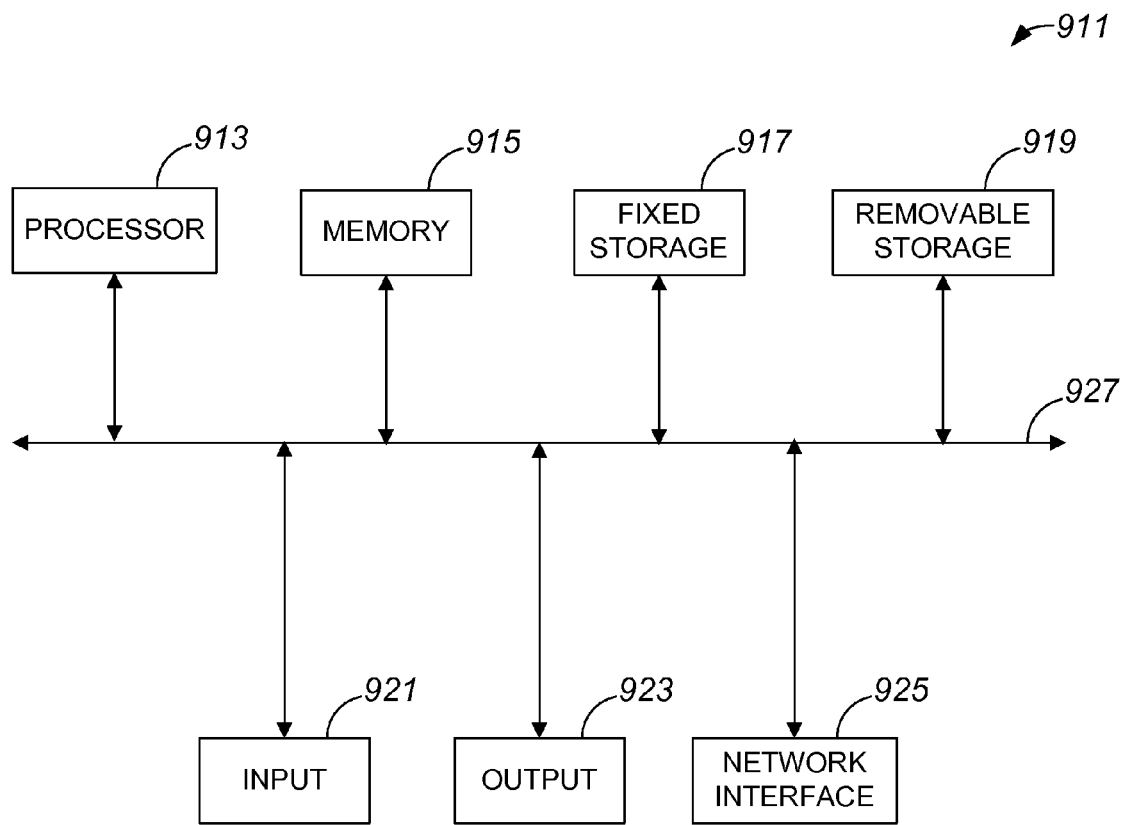
FIG. 9 is a block diagram representation of a computing system that may be utilized in association with the embodiments of the present invention.

FIG. 9 shows a block diagram of components that may be present in computer systems that implement embodiments of the invention. A computer system 911 includes a processor 913 that executes instructions from computer programs, including operating systems. Processor 913 may be utilized to enable a web application to run. Although processor 913 typically has memory caches, processor 913 may utilize memory 915, which may store instructions or computer code and data.

A fixed storage 917 may store computer programs and data such. Fixed storage 917 is typically persistent and provides more storage when compared to memory 915. A common fixed storage 917 for databases is multiple, e.g., arrays, hard drives. A removable storage 919 provides mobility to computer programs and/or data that are stored thereon. Removable storage 919 may include, but is not limited to, floppy disks, tape, CD/ROM, DVD, flash memory devices, and the like.

Memory 913, fixed storage 917 and removable storage 919 provide examples of computer readable storage media that may be utilized to store and retrieve computer programs incorporating computer codes that implement the invention, data for use with the invention, and the like. Additionally, a data signal embodied in a carrier wave, e.g., in a network including the Internet, may also be a computer readable storage medium. An input device 921 allows a user to interface with computer system 911. Input device 921 may be a keyboard, a mouse, buttons, dials, or any other suitable input mechanism. An output device 923 allows system 911 to provide output to the user. Output device 923 may include devices such as monitors, display screens, LEDs, printers, or substantially any other output mechanism.

A network interface 925 allows system 911 to interface with a network to which it is connected. The system bus architecture of computer system 911 is represented by arrows 927. The components shown in FIG. 9 may be found in many computer systems. However, components may be added, deleted, and combined without departing from the spirit or the scope of the present invention. For example, fixed storage 917 may be a file server that is accessed through a network connection. Thus, FIG. 9 is for illustration purposes and not limitation.

Although only a few embodiments of the present invention have been described, it should be understood that the present invention may be embodied in many other specific forms without departing from the spirit or the scope of the present invention. By way of example, substantially any suitable programming or scripting language may be used to create code used to dynamically render tables for display in a user interface web page. Languages other than Java may be used to implement the present invention.

While tables displayed in a user interface page have been shown as including strings for ease of illustrations, the tables may also include fields into which a user may enter input. That is, tables may include user input areas. Further, tables may include links, e.g., links to the World Wide Web or links to locations within an intranet, that a user may select which may open up a window in a web browser.

Various steps associated with creating a user interface page, e.g., steps associated with determining whether to display a scroll bar, have not been described. However, such steps are well known to those skilled in the art. In addition, the layout and the configuration of a user interface page may vary widely.

A user interface page that displays dynamically rendered tables has generally been described as being a user interface web page associated with a web application. It should be appreciated, however, that a user interface page that displays dynamically rendered tables may be associated with a wide variety of applications including, but not limited to, banking and sales applications that are not necessarily web-based. Banking applications may include dynamically rendered tables because, for instance, different types of accounts may be associated with different numbers of tables and different numbers of columns. Sales applications may include dynamic tables with dynamic content.

In general, the steps associated with methods of the present invention may vary widely. Steps may be added, removed, altered, combined and reordered without departing from the spirit or the scope of the present invention. Therefore, the present examples are to be considered as illustrative and not restrictive, and the invention is not to be limited to the details given herein, but may be modified within the scope of the appended claims.

The invention claimed is:

1. A method for rendering tables associated with a web application, the web application being arranged to display a first page, the method comprising:

obtaining an input to the web application;

determining an input type associated with the input, wherein the input type is associated with a predetermined first set of tables, the predetermined first set of tables is associated with every instance of the input type, the first set of tables includes a first subset and a second subset, the first subset including tables of the first set of tables that are suitable for being populated by the data, and the second subset including tables of the first set of tables that are not suitable for being populated by the data;

identifying the first set of tables by names of tables and a number of tables;

creating an object with L rows, where L is a natural number, using the names of tables and the number of tables, each row corresponding to one table of the first set of tables;

identifying an entity associated with the input by searching through a repository for information related to each of the L rows;

obtaining data associated with the entity;

identifying a first table of the first set of tables, the first table being associated with the first subset;

displaying the first table, associated with the first subset of the first set of tables, on the first page; and preventing tables included in the second subset of the first set of tables from being displayed on the first page.

2. The method of claim 1 further including:

identifying a second table of the first set of tables, the second table being associated with the second subset.

3. The method of claim 1 wherein each table included in the first subset of the first set of tables is displayed on the first page.

4. The method of claim 1 wherein the first table of the first set of tables has a number of rows, and the number of rows is determined dynamically.

5. The method of claim 1 wherein obtaining the input to the web application includes obtaining the input through a user interface of the first page.

6. The method of claim 1 wherein obtaining the data associated with the entity includes obtaining the data from a database.

7. The method of claim 1 comprising:
storing the data obtained associated with the entity in a hashmap, wherein the hashmap permits nulls and is associated with the first set of tables, and the data is correlated with a table in the first set of tables.

8. An apparatus for rendering tables associated with a web application, the web application being arranged to display a first page, the apparatus comprising:
a central processing unit and memory;
means for obtaining an input to the web application;
means for determining an input type associated with the input;
means for identifying a first set of tables based on the input type, wherein the first set of tables comprises a number of tables and names of tables, the first set of tables is associated with every instance of the input type, the first set of tables includes a first subset and a second subset, the first subset including tables of the first set of tables that include content associated with the input, and the second subset including tables of the first set of tables that do not include content associated with the input;
means for identifying an entity associated with the input;
means for obtaining data associated with the entity;
means for creating and storing the data associated with the entity in a data structure permitting nulls;
means for identifying a first table of the first set of tables, the first table being associated with the first subset;
means for displaying at least one table in the first subset of the first set of tables on the first page; and
means for preventing each table in the second subset of the first set of tables from being displayed on the first page.

9. The apparatus of claim 8 further including:
means for initializing a row counter R;
means for iterating using the row counter R through rows of the data structure; and
means for storing data corresponding to the first set of tables.

10. An apparatus for rendering tables, the apparatus comprising:
a central processing unit and memory;
code devices associated with a web application, the code devices associated with the web application being arranged to cause a set of tables associated with an input type to be displayed, wherein the input type is provided using a string data type, the set of tables is associated with every instance of the input type, and the set of tables including a first subset and a second subset;
a first element, the first element being arranged to execute the code devices associated with the web application, the code devices associated with the web application being arranged to identify the first subset of a set of tables associated with the input type to display, the first element further being arranged to obtain an input, the input being of the input type;
a database, the database being arranged to store data associated with the input; and
a display device, the display device being arranged to display a first page, wherein the first page includes the first subset of the set of tables and does not include the second subset of the set of tables, wherein the code devices associated with the web application are arranged to search the database for the first subset of the set of tables using the data based on the input, and each table of the first subset of tables contains data associated with the input and each table of the second subset of tables does not contain data associated with the input,
wherein the set of tables includes a first table associated with the first subset and a second table associated with the second subset, and the first table is displayed on the first page and the second table is not displayed on the first page.

11. The apparatus of claim 10 wherein the code devices of the web application identify the second subset of the set of tables using the data.

12. A method for dynamically rendering tables associated with a first input type to a web application, the method comprising:
obtaining an input of the first input type, the input being arranged to be utilized to identify data, and the first input type being arranged to designate a predetermined set of tables, the set of tables being associated with every instance of the input type;
associating the data with at least a first table of the set of tables, the at least first table of the set of tables being arranged to be populated by the data;
creating a first data structure having L rows, where L is a natural number, each row corresponding to one of the set of tables;
creating a second data structure, wherein the second data structure is a different type of data structure from the first data structure, and the second data structure permits nulls;
obtaining data corresponding to row L of the first data structure;
storing the data corresponding to row L of the first data structure in the second data structure, wherein the data is correlated to the at least first table of the set of tables
creating up to L of a third data structure, where L is a natural number, wherein the up to L of the third data structure comprises data associated with the second data structure;
for each of the up to L third data structures, populating the at least first table of the set of tables with the data;
providing the at least first table of the set of tables in a web page of the web application;
identifying at least a second table of the set of tables, wherein the at least second table of the set of tables does not have relevant data associated with the input stored in the up to L second data structures; and
preventing the at least second table of the set of tables from being provided to the web page.

13. The method of claim 12 wherein the set of tables includes a first and second subset, the first table is part of the first subset of tables and the second table is part of the second subset of tables.

14. The method of claim 12 wherein the second data structure is a hashmap and permits a null key.

15. The method of claim 12 wherein the input does not have associated data to display for the at least second table of the set of tables, further comprising storing an indictor in the second data structure that no data associated with row L of the first data structure has been obtained.

16. A computer program product for dynamically rendering tables associated with a first input type to a web application, the first input type being associated with a predetermined set of tables, the computer program product comprising:

code devices that cause an input of the first input type to be obtained, the input being arranged to be utilized to identify data, the predetermined set of tables being arranged to be associated with every instance of the input type, the set of tables being arranged to include at least a first table and at least a second table;

code devices that cause creating of an object, where each row in the object corresponds to one table in the predetermined set of tables, code devices that cause the data to be associated with at least a first table, the at least first table of the predetermined set of tables being arranged to be populated by the data;

code devices that cause, while looping through each of the rows of the object, the at least first table to be populated with the data;

code devices that cause the at least second table to be identified, the at least second table of the predetermined set of tables being arranged to not be populated by the data;

code devices that cause the at least first table to be provided in a web page of the web application; and code devices that cause the at least second table to be prevented from being provided to the web page.

17. The computer program product of claim 16 wherein the web page displays the at least first table and does not display the at least second table.

18. The computer program product of claim 16 wherein the computer code that causes the data to be associated with the at least first table of the predetermined set of tables includes computer code that causes information associated with the data to be stored in a hashmap, the hashmap permitting a null key, and computer code that causes the hashmap to be associated with a map of the predetermined set of tables.

19. An apparatus for dynamically rendering tables associated with a first input type to a web application, the first input type being associated with a predetermined set of tables, the predetermined set of tables being arranged to be associated with every instance of the first input type, and the predetermined set of tables being arranged to include a first subset and a second subset, the apparatus comprising:

a central processing unit and memory;

means for obtaining a first input of the first input type, the first input being arranged to be utilized to identify data associated with the first input;

means for associating the data associated with the first input with the first subset of the predetermined set of tables, each table of the first subset of the predetermined set of tables being arranged to be populated by the data associated with the first input;

means for populating each table of the first subset of the predetermined set of tables with the data associated with the first input;

means for identifying the second subset of the predetermined set of tables, wherein each table of the second subset of the predetermined set of tables does not contain data associated with the first input;

means for providing the first subset of the predetermined set of tables in a first web page of the web application; and means for preventing the second subset of the predetermined set of tables from being displayed in the first web page of the web application.

20. The method of claim 19 further comprising:

means for obtaining a second input of the first input type, the second input being arranged to be utilized to identify data associated with the second input;

means for associating the data associated with the second input with a third subset of the predetermined set of tables, each table of the third subset of the predetermined set of tables being arranged to be populated by the data associated with the second input;

means for populating each table of the third subset of the predetermined set of tables with the data associated with the second input;

means for identifying a fourth subset of the predetermined set of tables, wherein each table of the second subset of the predetermined set of tables does not contain data associated with the second input;

means for providing the third subset of the predetermined set of tables in a second web page of the web application; and means for preventing the fourth subset of the predetermined set of tables from being displayed in the second web page of the web application.

21. The method of claim 1 wherein each row of the object corresponds to a table that is to be used to display content associated with the input value.

22. A method for rendering tables associated with a web application, the method comprising:

obtaining a first input to the web application, the first input being of a first input type, wherein the first input type identifies a predetermined first set of tables by names of tables and a number of tables, the predetermined first set of tables is associated with a first instance of the input type, and the predetermined first set of tables includes a first subset and a second subset;

obtaining a second input to the web application, the second input being of the first input type, wherein the predetermined first set of tables is associated with a second instance of the input type;

creating a first object with L rows, where L is a natural number, wherein the first object is associated with the first input and each row corresponds to one table of the first set of tables;

creating a second object with L rows, where L is a natural number, wherein the second object is associated with the second input and each row corresponds to one table of the first set of tables;

obtaining first information corresponding to row L of the first object;

obtaining second information corresponding to row L of the second object;

storing the first information in a first data structure;

storing the second information in a second data structure;

displaying on a first page the first subset of the first set of tables associated with the first data structure, wherein each table of the first subset of the first set of tables has information associated with the table; and precluding on the first page the second subset of the first set of tables from being displayed, wherein each table of the second subset of the first set of tables does not have information associated with the table.

23. The method of claim 22 wherein each row of the first object corresponds to a table that is to be used to display content associated with the first input.

24. The method of claim 22 further comprising:

displaying on a second page the third subset of the first set of tables associated with the second data structure, wherein each table of the third subset of the first set of tables has information associated with the table.

25. The method of claim 22, wherein the predetermined first set of tables includes a third subset and a fourth subset, further comprising:

displaying on a second page the third subset of the first set of tables associated with the second data structure, wherein each table of the third subset of the first set of tables has information associated with the table; and
precluding on the second page the fourth subset of the first set of tables from being displayed, wherein each table of the fourth subset of the first set of tables does not have information associated with the table.

26. The method of claim 24 wherein the first subset of the first set of tables is different from the third subset of the first set of tables.

27. The method of claim 24 wherein a number of tables in the first subset is different from a number of tables in the third subset.

* * * * *